W. F. JOHNSON.
Rotary Cultivator.

No. 28,583.

Patented June 5, 1860.

UNITED STATES PATENT OFFICE.

W. F. JOHNSON, OF WETUMPKA, ALABAMA.

IMPROVEMENT IN COTTON-CULTIVATORS.

Specification forming part of Letters Patent No. 28,583, dated June 5, 1860.

*To all whom it may concern:*

Be it known that I, W. F. JOHNSON, of Wetumpka, in the county of Elmore and State of Alabama, have invented a new and Improved Cotton-Cultivator; and I do hereby declare that the following is a full, clear, and exact description of the same, reference being had to the annexed drawings, making a part of this specification, in which—

Figure 1:
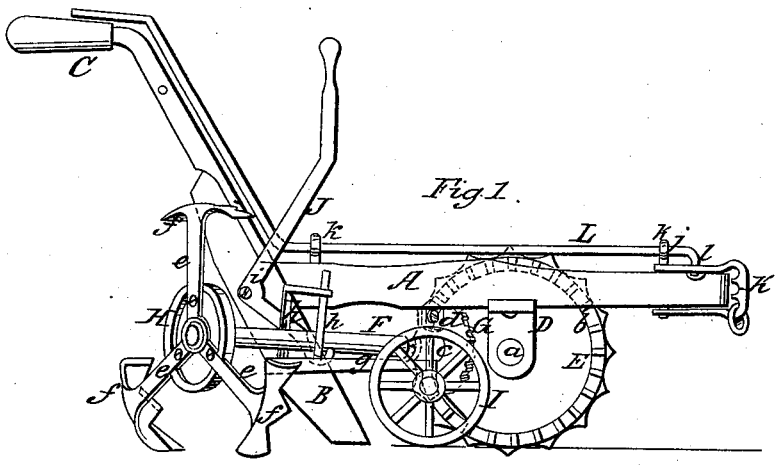
Figure 2:
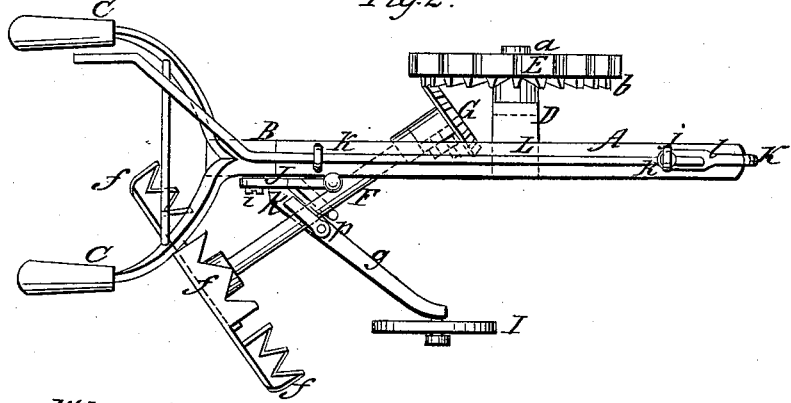

Figure 1 is a side view of my invention. Fig. 2 is a plan or top view of the same.

Similar letters of reference indicate corresponding parts in the two figures.

This invention consists in the employment or use of a rotary wheel attached to a beam, provided with hoes or cutters, and so arranged as to be placed under the complete control of the operator, and rotated by the draft movement of the machine, the wheel being placed in such relation with the beam that the knives or hoes will pass obliquely over the rows of plants and cut or thin them out as required.

To enable those skilled in the art to fully understand and construct my invention, I will proceed to describe it.

A represents the beam of the implement, which is similar to an ordinary plow-beam.

B is a foot attached to the back end of the beam, and C C are handles attached to the upper end of the foot.

To the beam A, at a point a short distance in front of its center, there is attached a pendant, D, having an axle, *a*, at its lower end, on which a wheel, E, is placed and allowed to rotate freely. The wheel E is toothed at its inner side, as shown at *b*.

To the under side of the beam A a bearing, *c*, is attached by a joint, *d*, and in this bearing one end of a shaft, F, is placed and allowed to rotate freely. On the front end of shaft F a pinion, G, is placed, which pinion, when the shaft is about in a horizontal position, gears into the teeth of wheel E, as shown in Fig. 2. The shaft F has an oblique position relatively with the beam A, as shown in Fig. 2, and the joint *d* of the bearing *c* is so arranged as to allow the shaft F to be raised and lowered in the arc of a circle and on said joint as a center.

On the back part of the shaft F there is placed a hub or wheel, H', to which radial arms *e* are attached, each arm being provided at its end with cutters or hoes *f* of any suitable form. To the foot B, below the beam A, an arm, *g*, is attached obliquely with the beam and about at right angles with the shaft F. This arm *g* has two uprights, *h h*, attached, between which the shaft F is placed, and the front end of the arm *g* has a wheel, I, attached, to it, the plane of rotation of the latter being parallel with the beam, as shown clearly in Fig. 2.

To the foot B a bent lever, J, is attached by a fulcrum-pin, *i*. The lower end of lever J is of curved or hook form, and projects underneath the shaft F, so that the latter may be raised when required by drawing back the upper end of lever J, as will be fully understood by referring to Fig. 1.

K is a clevis, which is attached to the front end of the beam A by a pin, *j*. This clevis is constructed in the usual way, as will be seen by referring to Fig. 1.

L is a shaft, which is fitted in suitable bearings, *k*, on the upper surface of the beam A. The front end of shaft L is bent downward and fitted in the clevis, as shown at *l*, and the back part of said shaft is bent upward and extends to the upper ends of the handles, so that it may readily be grasped by the attendant or operator. By moving the upper end of the shaft L to the right or left the clevis K will also be moved and the implement guided to the right or left, as occasion may require. This arrangement therefore places the machine under the perfect control of the operator, a certain adjusting movement being allowed the implement independently of the team.

The periphery of the wheel E is scalloped, so as to form points to prevent its slipping, and thereby insure a rotation of the cutters on hub or wheel H'. The wheel I has a tendency to keep the implement running in a right line.

By drawing the upper end of lever J fully back the cutters or hoes *f* may be elevated entirely above the surface of the earth and the pinion G disengaged from the teeth of wheel F. This is necessary in order to permit the cutters or hoes to pass over obstructions that may lie in their path of rotation. The cutters or hoes, as the machine is drawn along, thin or cut out the plants as required, and the cutters or hoes may be made to cut more or less deep by adjusting the shaft F higher or lower by means of keys placed on the arm $g$ underneath the shaft F, or a set-screw may pass vertically through the arm and actuate or adjust a central bearing for said shaft.

I do not claim a rotary cutting-wheel for thinning out cotton-plants, for such device has been previously used, but arranged entirely different from the plan herein shown and described; nor do I claim the clevis K, for that has been previously used; but I do claim as new and desire to secure by Letters Patent—

The arrangement of the beam A, wheel E, shaft F, with cutters or hoes $f$ attached, and lever J, with or without the wheel I, substantially as and for the purpose set forth.

W. F. JOHNSON.

Witnesses:
R. GREENE,
A. BURROWS.